United States Patent
Wang et al.

(10) Patent No.: US 11,543,795 B2
(45) Date of Patent: Jan. 3, 2023

(54) AIRPLANE STRUCTURE STIFFENER REPAIR METHOD BASED ON MEASURED DATA

(71) Applicant: NANJING UNIVERSITY OF AERONAUTICS AND ASTRONAUTICS, Jiangsu (CN)

(72) Inventors: Jun Wang, Jiangsu (CN); Zeyong Wei, Jiangsu (CN); Honghua Chen, Jiangsu (CN)

(73) Assignee: NANJING UNIVERSITY OF AERONAUTICS AND ASTRONAUTICS, Nanjing (CN)

(*) Notice: Subject to any disclaimer, the term of this patent is extended or adjusted under 35 U.S.C. 154(b) by 193 days.

(21) Appl. No.: 17/026,262

(22) Filed: Sep. 20, 2020

(65) Prior Publication Data
US 2021/0341900 A1    Nov. 4, 2021

(51) Int. Cl.
*G05B 19/402* (2006.01)
*G01M 5/00* (2006.01)

(52) U.S. Cl.
CPC ......... *G05B 19/402* (2013.01); *G01M 5/0016* (2013.01); *G05B 2219/32228* (2013.01); *G05B 2219/35519* (2013.01)

(58) Field of Classification Search
CPC ........ G05B 19/402; G05B 2219/32228; G05B 2219/35519; G01M 5/0016; B64F 5/40;
(Continued)

(56) References Cited

U.S. PATENT DOCUMENTS

| | | | | |
|---|---|---|---|---|
| 2018/0095450 A1* | 4/2018 | Lappas | ................ | B33Y 10/00 |
| 2019/0012416 A1* | 1/2019 | Chen | ..................... | G06F 30/23 |
| 2019/0196436 A1* | 6/2019 | Nagarajan | ............ | G05B 19/124 |

FOREIGN PATENT DOCUMENTS

| | | | |
|---|---|---|---|
| CN | 104598675 A | 5/2015 | |
| CN | 105956234 A | 9/2016 | |

(Continued)

OTHER PUBLICATIONS

Chen Jian, Dai Nanshan, Chen Xiaolong, Liu Bo and Jiang Chao; Simulation and Optimization Research on Stamping Forming Process of Front Beam in Automobile Lower Reinforcement; Jan. 31, 2020; School of Mechanical and Launch Engineering, Hunan University, Changsha 410000, China.
(Continued)

*Primary Examiner* — Kenneth M Lo
*Assistant Examiner* — Tameem D Siddiquee

(57) ABSTRACT

The present invention relates to an airplane structure stiffener repair method based on measured data guidance. The method includes: respectively measuring point cloud data on a surface of a structure stiffener and point cloud data on a surface of a to-be-assembled position of a body; respectively extracting all assembly plane features in two point cloud data based on an RANSAC algorithm; performing pre-alignment according to the plane features; performing accurate alignment based on a signed distance constraint according to repair tolerance requirements; and calculating a repair allowance, and generating a machining path to serve as an accurate machining basis. According to the method in the present invention, a repair amount can be accurately calculated by virtue of an alignment algorithm of the signed distance constraint, and an envelope relationship during model matching is met.

2 Claims, 1 Drawing Sheet

(58) Field of Classification Search
CPC ...... G06F 30/20; G06F 30/15; G06F 2111/10; G06F 2119/18
See application file for complete search history.

(56) References Cited

FOREIGN PATENT DOCUMENTS

| CN | 109145471 A | 1/2019 |
|----|-------------|--------|
| CN | 110084779 A | 8/2019 |
| CN | 110990975 A | 4/2020 |
| CN | 111077844 A | 4/2020 |

OTHER PUBLICATIONS

Zhang Wei; Research on Aircraft Components Digital Preassembly Based on Measured Data; Mar. 15, 2017; Nanjing University of Aeronautics and Astronautics, The Graduate School, College of Mechanical and Electrical Engineering.

* cited by examiner

US 11,543,795 B2

AIRPLANE STRUCTURE STIFFENER REPAIR METHOD BASED ON MEASURED DATA

TECHNICAL FIELD

The present invention belongs to the field of aviation manufacturing, and particularly relates to an airplane structure stiffener repair method based on measured data.

BACKGROUND OF THE PRESENT INVENTION

Part of an airplane is increasingly aged during use, and cracks of an important bearing component of the airplane are obviously increased. Since each airplane has differences in a crack state and a body structure, such as crack part, crack length and structural deformation, appearances of needed structure stiffeners have differences. Meanwhile, due to reasons such as different manufacturing batches and different usage states of the airplane, structure sizes in the same region also have differences. To facilitate production organization, the airplane is manufactured, stored and constructed according to a large-size stiffening scheme at present. For the above reasons, stiffener appearances should be accurately repaired in an airplane repair process. However, a manual machining manner is mainly adopted in the current repair process, and problems of uncontrollability and long period exist.

SUMMARY OF THE PRESENT INVENTION

The present invention proposes an airplane structure stiffener repair method based on measured data capable of realizing efficient and accurate repair of a structure stiffener.

Technical solutions adopted in the present invention are as follows:

1. An airplane structure stiffener repair method based on measured data guidance, comprising the following steps:

S1: respectively scanning to acquire point cloud data P on a surface of an airplane structure stiffener and point cloud data Q on the surface of a to-be-assembled position of the airplane body;

S2: respectively extracting all assembly plane features in the point cloud data P and Q;

S3: performing pre-alignment based on the extracted assembly plane features according to a structural assembly relationship between the airplane structure stiffener and the to-be-assembled position of the body;

S4: performing accurate alignment based on a signed distance constraint according to repair tolerance requirements;

S5: calculating a repair allowance, and generating an accurate machining path to serve as an accurate machining basis on a machining platform.

2. The airplane structure stiffener repair method based on measured data according to claim 1, wherein the step S1 comprises:

S101: scanning to acquire the point cloud data $P=\{p_1, p_2, \ldots, p_m\}$ on the surface of the airplane structure stiffener, wherein m is the number of points in the point cloud data P; the point cloud data P comprises a normal $N^P=\{n_1^P, n_2^P, \ldots, n_m^P\}$ by default; if no normal exists, normal information may be calculated by a PCA method.

S102: scanning to acquire the point cloud data $Q=\{q_1, q_2, \ldots, q_l\}$ on the surface of the to-be-assembled position of the body, wherein l is the number of points in the point cloud data Q; the point cloud data Q comprises a normal $N^q=\{n_1^q, n_2^q, \ldots, n_l^q\}$ by default; if no normal exists, normal information may be calculated by a PCA method.

3. The airplane structure stiffener repair method based on measured data guidance according to claim 1 or 2, wherein the step S2 comprises:

S201: for the point cloud data P, extracting all assembly plane features by an RANSAC algorithm; and S202: for the point cloud data Q, extracting all assembly plane features by the RANSAC algorithm.

4. The airplane structure stiffener repair method based on measured data according to claim 3, wherein the step S3 comprises:

S301: determining correspondence of assembly planes between the point cloud data P and the point cloud data Q according to the structural assembly relationship between the airplane structure stiffener and the to-be-assembled position of the body;

S302: performing pre-alignment on the point cloud data Q and the point cloud data P by an SVD method according to the assembly relationship in correspondence and the extracted assembly plane features.

5. The airplane structure stiffener repair method based on measured data guidance according to claim 4, wherein the step S4 comprises:

S401: finding out a corresponding closest Euclidean distance point $p_i$ in the point cloud data P for any point $q_i$ in the point cloud data Q according to a closest distance relationship in accordance with a pre-alignment result of the point cloud data P and the point cloud data Q;

S402: constructing optimization functions based on a signed distance constraint according to the repair tolerance requirements:

$$\min_T \sum_{i=1}^{l} (\|T(q_i) - p_i\|_2 - \theta)^2 \quad (1)$$

$$n_i^P \cdot (T(q_i) - p_i) < 0 \quad (2)$$

in the formulas (1) and (2), min represents a minimum value; T is a to-be-solved transformation matrix; $\|*\|_2$ is 2-norm; $\theta$ is repair tolerance; $T(q_i)$ is the transformed point $q_i$ by the transformation matrix T; and $n_i^P$ is the normal at the point $p_i$;

S403: repeating the steps S401 and S402; solving the T that makes the (1) minimum by an iteration method; stopping iteration when the number of iterations reaches a preset value (generally 10) or an error is less than a preset threshold after alignment; and performing transformation on the Q with the T so as to acquire point cloud data Q' after accurate alignment of the point cloud data P.

6. The airplane structure stiffener repair method based on measured data guidance according to claim 5, wherein the step S5 comprises:

S501: calculating a closest Euclidean distance $d_i$ from each point in the point cloud data P to the point cloud data Q' after accurate alignment according to an accurate alignment result;

S502: obtaining a minimum spanning tree from the point cloud at the to-be-assembled position of the body structure after accurate alignment by using a Prim algorithm, and solving the longest path therein (e.g., a critical path, using a general algorithm for graphs), that is, a machining path, as shown by a heavy line in FIG. 2;

S503: providing the machining path and the repair amount for a machining center, and performing accurate repair machining.

The present invention has beneficial effects as follows:

According to the method in the present invention, the repair amount can be accurately calculated by virtue of the alignment algorithm of the signed distance constraint, and an envelope relationship during model matching is met. According to the method in the present invention, the point cloud data is processed by virtue of software programs; the accurate machining path of the to-be-machined structure stiffener can be efficiently generated; the problems that machining precision is low and working efficiency is low during structure stiffener allowance removal and accurate repair in structure repairing are effectively solved; and the repair efficiency and quality of the airplane structure stiffener are increased.

DETAILED DESCRIPTION OF THE PRESENT INVENTION

An airplane structure stiffener repair method based on measured data guidance in the present invention is further introduced below in combination with drawings.

Figure 1:
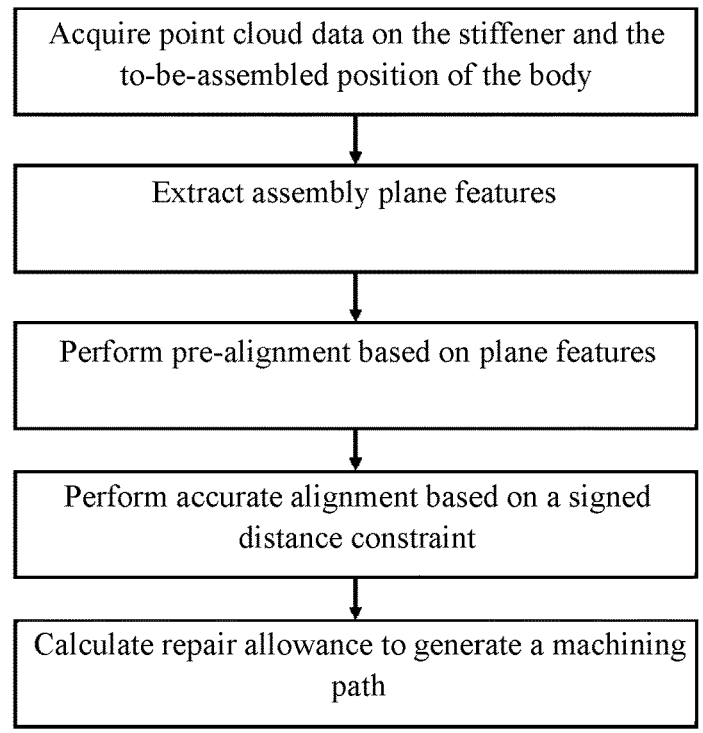
FIG. 1 is a flow block diagram of an airplane structure stiffener repair method based on measured data guidance according to the present invention.

As shown in FIG. 1, the airplane structure stiffener repair method based on measured data guidance comprises the following steps:

S1: Respectively scanning to acquire point cloud data P on a surface of an airplane structure stiffener and point cloud data Q on a surface of a to-be-assembled position of a body by a 3D scanner.

The step S1 specifically comprises:

S101: scanning to acquire the point cloud data P={$p_1$, $p_2$, ..., $p_m$} on the surface of the airplane structure stiffener, wherein m is the number of points in the point cloud data P; the point cloud data P comprises a normal $N^p$={$n_1^p$, $n_2^p$, ..., $n_m^p$} by default; if no normal exists, normal information may be calculated by a PCA method; and S102: scanning to acquire the point cloud data Q={$q_1$, $q_2$, ..., $q_l$} on the surface of the to-be-assembled position of the body, wherein l is the number of points in the point cloud data Q; the point cloud data Q comprises a normal $N^q$={$n_1^q$, $n_2^q$, ..., $n_l^q$} by default; if no normal exists, normal information may be calculated by a PCA method.

S2: Respectively extracting all assembly plane features in the point cloud data P and Q.

The step S2 specifically comprises:

S201: for the point cloud data P, extracting all assembly plane features by an RANSAC algorithm; and S202: for the point cloud data Q, extracting all assembly plane features by the RANSAC algorithm.

Since point cloud data has characteristics of higher redundancy and non-uniform sampling density and a data structure is unclear, an assembly feature extraction process has a certain difficulty. A random sample consensus method (RANSAC) is a common point cloud data feature detection method, and is capable of effectively and accurately meeting the needs of performing feature segmentation and feature information extraction on a physical scan model in virtual assembly. For point cloud data P of the structure stiffener and point cloud data Q of the body structure, all assembly plane features are respectively extracted by adopting the RANSAC algorithm.

S3: Performing pre-alignment based on the extracted assembly plane features according to a structural assembly relationship between the airplane structure stiffener and the to-be-assembled position of the body.

The step S3 specifically comprises:

S301: determining correspondence of assembly planes between the point cloud data P and the point cloud data Q according to the structural assembly relationship between the airplane structure stiffener and the to-be-assembled position of the body;

S302: performing pre-alignment on the point cloud data Q and the point cloud data P by an SVD method according to the assembly relationship in correspondence and the extracted assembly plane features.

S4: Performing accurate alignment based on a signed distance constraint according to the existing regulated repair tolerance requirements.

The step S4 specifically comprises:

S401: finding out a corresponding closest Euclidean distance point $p_i$ in the point cloud data P for any point $q_i$ in the point cloud data Q according to a closest distance relationship in accordance with a pre-alignment result of the point cloud data P and the point cloud data Q;

S402: constructing optimization functions based on a signed distance constraint according to the repair tolerance requirements:

$$\min_T \sum_{i=1}^{l} (\|T(q_i) - p_i\|_2 - \theta)^2 \quad (1)$$

$$n_i^p \cdot (T(q_i) - p_i) < 0 \quad (2)$$

in the formulas (1) and (2), min represents a minimum value; T is a to-be-solved transformation matrix; $\|*\|_2$ is 2-norm; $\theta$ is repair tolerance; $T(q_i)$ is the transformed point $q_i$ by the transformation matrix T; and $n_i^p$ is the normal at the point $p_i$;

S403: repeating the steps S401 and S402; solving the T that makes the (1) minimum by an iteration method; stopping iteration when the number of iterations reaches a preset value (generally 10) or an error is less than a preset threshold after alignment; and performing transformation on the Q with the T so as to acquire point cloud data Q' after accurate alignment of the point cloud data P.

S5: Calculating a repair allowance, and generating an accurate machining path to serve as an accurate machining basis on a machining platform.

Figure 2:
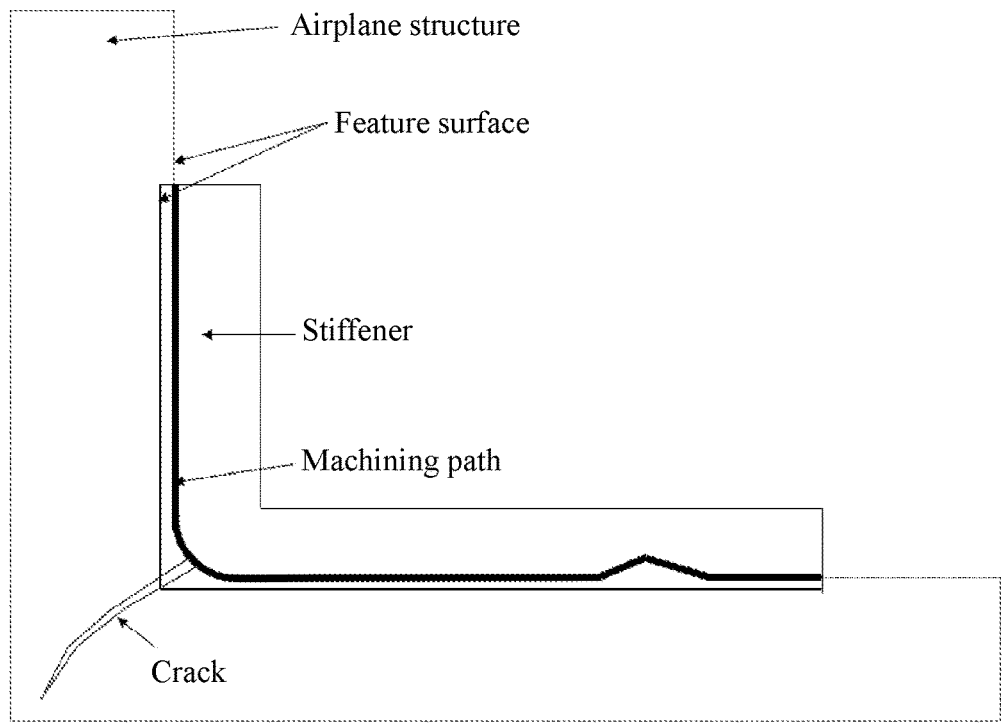
FIG. 2 is a schematic diagram of a machining path after accurate alignment of a body structure and a structure stiffener.

The step S5 specifically comprises:

S501: calculating a closest Euclidean distance $d_i$ from each point in the point cloud data P to the point cloud data Q' after accurate alignment according to an accurate alignment result;

S502: obtaining a minimum spanning tree from the point cloud at the to-be-assembled position of the body structure after accurate alignment by using a Prim algorithm, and solving the longest path therein (e.g., a critical path, using a general algorithm for graphs), that is, a machining path, as shown by a heavy line in FIG. 2;

S503: providing the machining path and the repair amount for a machining center, and performing accurate repair machining.

The above only describes preferred embodiments of the present invention, rather than limits the present invention in any form. Although the present invention has been disclosed in the above preferred embodiments, the embodiments are not used for limiting the present invention. Those skilled in the art may make some changes or modifications to obtain equivalent embodiments with equivalent changes by utilizing the above disclosed technical contents without departing from the scope of the technical solutions of the present invention. However, any simple modifications, equivalent replacements and improvements made to the above embodiments in the spirit and principle of the present invention in accordance with the technical essence of the present invention without departing from the contents of the technical solutions of the present invention shall also belong to the protection scope of the technical solutions of the present invention.

What claimed is:

1. An airplane structure stiffener repair method based on measured data guidance, comprising the following steps:

S1: respectively scanning to acquire point cloud data P on a surface of an airplane structure stiffener and point cloud data Q on a surface of a to-be-assembled position of a body;

S2: respectively extracting all assembly plane features in the point cloud data P and Q;

S3: performing pre-alignment based on the extracted assembly plane features according to a structural assembly relationship between the airplane structure stiffener and the to-be-assembled position of the body;

S4: performing alignment based on a signed distance constraint according to repair tolerance requirements; and S5: calculating a repair allowance, and generating a machining path to serve as a machining basis on a machining platform;

wherein the step S2 comprises:

S201: for the point cloud data P, extracting all assembly plane features by a Random Sample Consensus ("RANSAC") algorithm; and S202: for the point cloud data Q, extracting all assembly plane features by the RANSAC algorithm;

the step S3 comprises:

S301: determining correspondence of assembly planes between the point cloud data P and the point cloud data Q according to the structural assembly relationship between the airplane structure stiffener and the to-be-assembled position of the body;

S302: performing pre-alignment on the point cloud data Q and the point cloud data P by a singular value decomposition ("SVD") method according to the assembly relationship in correspondence and the extracted assembly plane features;

the step S4 comprises:

S401: finding out a corresponding closest Euclidean distance point $p_i$ in the point cloud data P for any point $q_i$ in the point cloud data Q according to a closest distance relationship in accordance with a pre-alignment result of the point cloud data P and the point cloud data Q;

S402: constructing optimization functions based on a signed distance constraint according to the repair tolerance requirements:

$$\min_T \sum_{i=1}^{l} (\|T(q_i) - p_i\|_2 - \theta)^2 \quad (1)$$

$$n_i^p \cdot (T(q_i) - p_i) < 0 \quad (2)$$

in the formulas (1) and (2), min represents a minimum value; T is a to-be-solved transformation matrix; $\|*\|_2$ is 2-norm; $\theta$ is repair tolerance; $T(q_i)$ is the transformed point $q_i$ by the transformation matrix T; and $n_i^p$ is the normal at the point $p_i$;

S403: repeating the steps S401 and S402; solving the T that makes the (1) minimum by an iteration method; stopping iteration when the number of iterations reaches a preset value or an error is less than a preset threshold after alignment; and performing transformation on the Q with the T so as to acquire point cloud data Q' after alignment of the point cloud data P;

the step S5 comprises:

S501: calculating a closest Euclidean distance $d_i$ from each point in the point cloud data P to the point cloud data Q' after alignment according to an alignment result;

S502: obtaining a minimum spanning tree from the point cloud at the to-be-assembled position of the body structure after alignment by using a Prim algorithm, and solving the longest path therein;

S503: providing the machining path and the repair amount for a machining center, and performing repair machining.

2. The airplane structure stiffener repair method based on measured data guidance according to claim 1, wherein the step S1 comprises:

S101: scanning to acquire the point cloud data P={$p_1$, $p_2$, ..., $p_m$} on the surface of the airplane structure stiffener, wherein m is the number of points in the point cloud data P; the point cloud data P comprises a normal $N^p$={$n_1^p$, $n_2^p$, ..., $n_m^p$} by default; if no normal exists, normal information may be calculated by a principal component analysis ("PCA") method; and S102: scanning to acquire the point cloud data Q={$q_1$, $q_2$, ..., $q_l$} on the surface of the to-be-assembled position of the body, wherein l is the number of points in the point cloud data Q; the point cloud data Q comprises a normal $N^q$={$n_1^q$, $n_2^q$, ..., $n_l^q$} by default; if no normal exists, normal information may be calculated by a PCA method.

* * * * *